US011920390B1

(12) United States Patent
Kennedy et al.

(10) Patent No.: US 11,920,390 B1
(45) Date of Patent: Mar. 5, 2024

(54) LATCH ASSEMBLY FOR A MINE DOOR AND A MINE DOOR HAVING SUCH AN ASSEMBLY

(71) Applicant: Jack Kennedy Metal Products & Buildings, Inc., Taylorville, IL (US)

(72) Inventors: William R. Kennedy, Taylorville, IL (US); John M. Kennedy, Taylorville, IL (US)

(73) Assignee: JACK KENNEDY METAL PRODUCTS & BUILDINGS, INC., Taylorville, IL (US)

( * ) Notice: Subject to any disclaimer, the term of this patent is extended or adjusted under 35 U.S.C. 154(b) by 0 days.

(21) Appl. No.: 18/148,608

(22) Filed: Dec. 30, 2022

(51) Int. Cl.
*E05C 3/00* (2006.01)
*E05C 3/16* (2006.01)
(Continued)

(52) U.S. Cl.
CPC .............. *E05C 3/167* (2013.01); *E05C 3/006* (2013.01); *E05C 9/1875* (2013.01); *E21F 1/10* (2013.01); *E05Y 2800/12* (2013.01)

(58) Field of Classification Search
CPC .......... E05C 3/167; E05C 3/008; E05C 3/006; E05C 3/16; E05C 3/165; E05C 3/042; E05C 9/02; E05C 9/04; E05C 9/043; E05C 9/048; E05C 9/20; E05C 9/028; E05C 9/08; E05C 9/1875; E05C 9/1883; E05Y 2800/12;
(Continued)

(56) References Cited

U.S. PATENT DOCUMENTS 2,050,155 A * 8/1936 Birchfield ............... E05C 3/167 70/156
4,639,021 A * 1/1987 Hope ...................... E05C 9/043 292/7
(Continued)

FOREIGN PATENT DOCUMENTS

CN 107503589 A * 12/2017 ............. E05B 1/003
CN 211174220 U * 8/2020 ......... E05B 47/0012
(Continued)

OTHER PUBLICATIONS

Merriam-Webster. (n.d.). Capture. In Merriam-Webster.com dictionary. Retrieved Jun. 12, 2023, from https://www.merriam-webster.com/dictionary/capture (Year: 2023).*

*Primary Examiner* — Kristina R Fulton
*Assistant Examiner* — Emily G. Brown
(74) *Attorney, Agent, or Firm* — Armstrong Teasdale LLP

(57) ABSTRACT

A latch assembly for a door having a door body mounted on a door frame includes a retainer movable between a latching position and a non-latching position and configured, in the latching position, to retain the door body in a closed position, and to permit the door body to move with respect to the door frame in the non-latching position to an open position. An actuator is selectively moveable to change the retainer from the latching position to a non-latching position. A linkage is configured to move the retainer in a latching direction toward the latching position and in an unlatching direction toward the non-latching position responsive to actuation of the actuator. A crank is operatively connected to the actuator and linkage and configured to move the retainer toward the latching position as the retainer approaches the latching position.

14 Claims, 15 Drawing Sheets

(51) Int. Cl.
*E05C 9/18* (2006.01)
*E21F 1/10* (2006.01)

(58) Field of Classification Search
CPC .. E05B 53/00; E05B 63/0056; E05B 65/0057; E05B 65/0075; E05B 17/203; E05B 17/2038; E05B 65/0817; E05G 1/04
USPC ........................................................ 292/256.5
See application file for complete search history.

(56) References Cited

U.S. PATENT DOCUMENTS 4,893,849 A * 1/1990 Schlack .................... E05C 5/00 292/7
5,168,667 A * 12/1992 Kennedy ................. E05C 3/042 292/241
5,911,763 A * 6/1999 Quesada ................... E05C 9/06 70/108
6,308,396 B1 * 10/2001 Lewis ........................ E05D 7/14 29/521
7,393,025 B2 7/2008 Kennedy et al.
8,347,665 B2 * 1/2013 Rasmussen ......... E05B 65/0075 70/91
2017/0107817 A1 * 4/2017 Kennedy ................... E21F 1/10
2017/0241166 A1 * 8/2017 Cheng ........................ E05C 7/04
2017/0284137 A1 * 10/2017 Alfredsson ............... E05C 5/00
2021/0262255 A1 * 8/2021 Blum .................... B64C 1/1407

FOREIGN PATENT DOCUMENTS

WO WO-2016185973 A1 * 11/2016 ......... E05B 47/0012
WO WO-2019064192 A1 * 4/2019 ......... E05B 47/0012

* cited by examiner

LATCH ASSEMBLY FOR A MINE DOOR AND A MINE DOOR HAVING SUCH AN ASSEMBLY

FIELD

The present disclosure generally relates to mine doors, and more particularly to an improved latch assembly for a mine door.

BACKGROUND

As known in the art, stoppings are used to control the flow of ventilation air through a mine. A stopping often includes an opening closed by a door to allow passage through the stopping, as described for example in our U.S. Pat. No. 7,393,025, hereby incorporated herein by reference. Mine doors of this type, sold by Jack Kennedy Metal Products & Buildings, Inc. of Taylorville, Illinois, U.S.A., have proven to be commercially successful.

Mine ventilation systems, which include such stoppings and mine doors, are used to remove harmful gases, e.g., methane and carbon dioxide, that are released from underground mines and to provide breathable air to mine personnel working in underground mines. Such ventilation systems typically include predetermined airflow circuits to regulate proper flow of air and eliminate toxic gases from the underground mine. A main circuit is often provided for flow-through ventilation of the underground mine while air is distributed by one or more auxiliary circuits to different workings or areas of the mine. Mining ventilation systems often use stoppings, doors, fans, brattices, overcasts and/or regulators for distribution of air through the various airflow circuits and controlling the volume of airflow as desired.

While known mine doors used in such underground mine ventilations systems have been effective, improvements are needed.

SUMMARY

In one aspect, a latch assembly for a door generally comprises a door body mounted on a door frame. The door body is moveable relative to the door frame between an open position of the door and a closed position of the door. The latch assembly generally comprises a retainer movable between a latching position and a non-latching position. The retainer is configured in the latching position to retain the door body in the closed position of the door, and to permit the door body to move with respect to the door frame in the non-latching position to permit the door body to move to the open position of the door. An actuator is selectively moveable by a user to change the retainer from the latching position to a non-latching position. A linkage operatively links the actuator to the retainer. The linkage is configured to move the retainer in a latching direction toward the latching position and in an unlatching direction toward the non-latching position responsive to actuation of the actuator. A crank is operatively connected to the actuator and linkage and configured to move the retainer toward the latching position as the retainer approaches the latching position.

In another aspect, a latch assembly for a door generally comprises a door body mounted on a door frame. The door body is moveable relative to the door frame between an open position of the door and a closed position of the door. The latch assembly generally comprises a retainer movable between a latching position and a non-latching position. The retainer is configured in the latching position to retain the door body in the closed position of the door, and to permit the door body to move with respect to the door frame in the non-latching position to permit the door body to move to the open position of the door. An actuator is selectively moveable by a user to change the retainer from the latching position to a non-latching position. A linkage operatively links the actuator to the retainer. The linkage is configured to move the retainer in a latching direction toward the latching position and in an unlatching direction toward the non-latching position responsive to actuation of the actuator wherein the linkage is configured to be in an over-center configuration when the retainer is in the latching position.

In yet another aspect, a mine door, which is installed in a mine for selectively opening and closing a door passageway of a door frame, generally comprises a door body moveable between a closed position of the door and an open position of the door to selectively close and open the door passageway. The door body includes a first face configured to face the door opening when in the closed position, and a second face configured to face away from the door opening when in the closed position. A latch assembly is supported by the door body and moveable between a latching configuration for retaining the door body in the closed position and in a non-latching configuration for permitting the door body to be moved to the open position. The latch assembly generally comprises a retainer movable between a latching position and a non-latching position. The retainer, in the latching position, retains the door body in the closed position, and permits the door body to move with respect to the door frame in the non-latching position to the open position. An actuator is actuable to change the latch assembly from the non-latching configuration to the latching configuration. A linkage operatively links the actuator to the retainer. The linkage is configured to move the retainer in a latching direction toward the latching position and in an unlatching direction toward the non-latching position responsive to actuation of the actuator.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
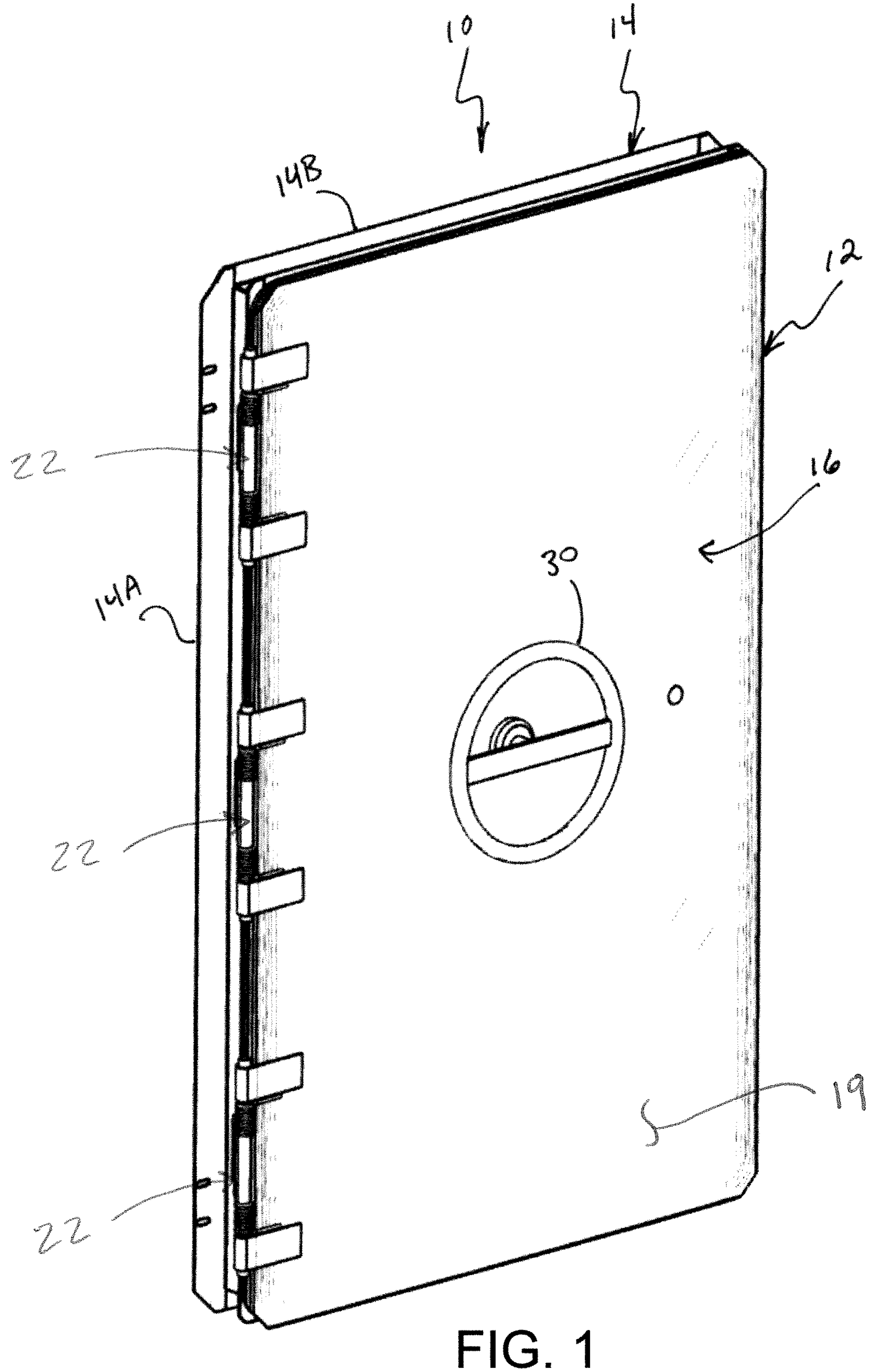
FIG. 1 is a front perspective of a mine door assembly of the present application.
Figure 2:
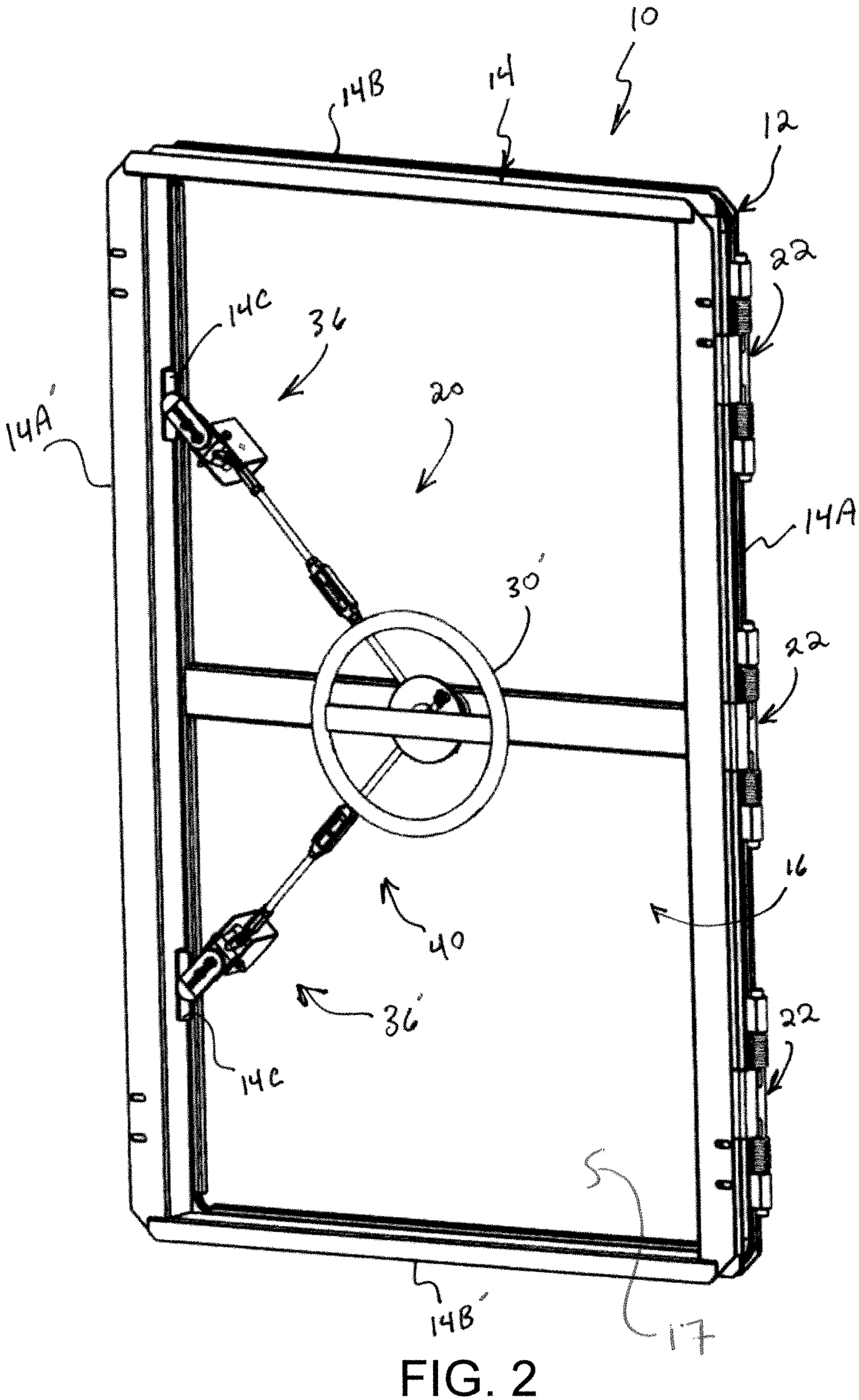
FIG. 2 is a rear perspective of the mine door assembly.
Figure 14:
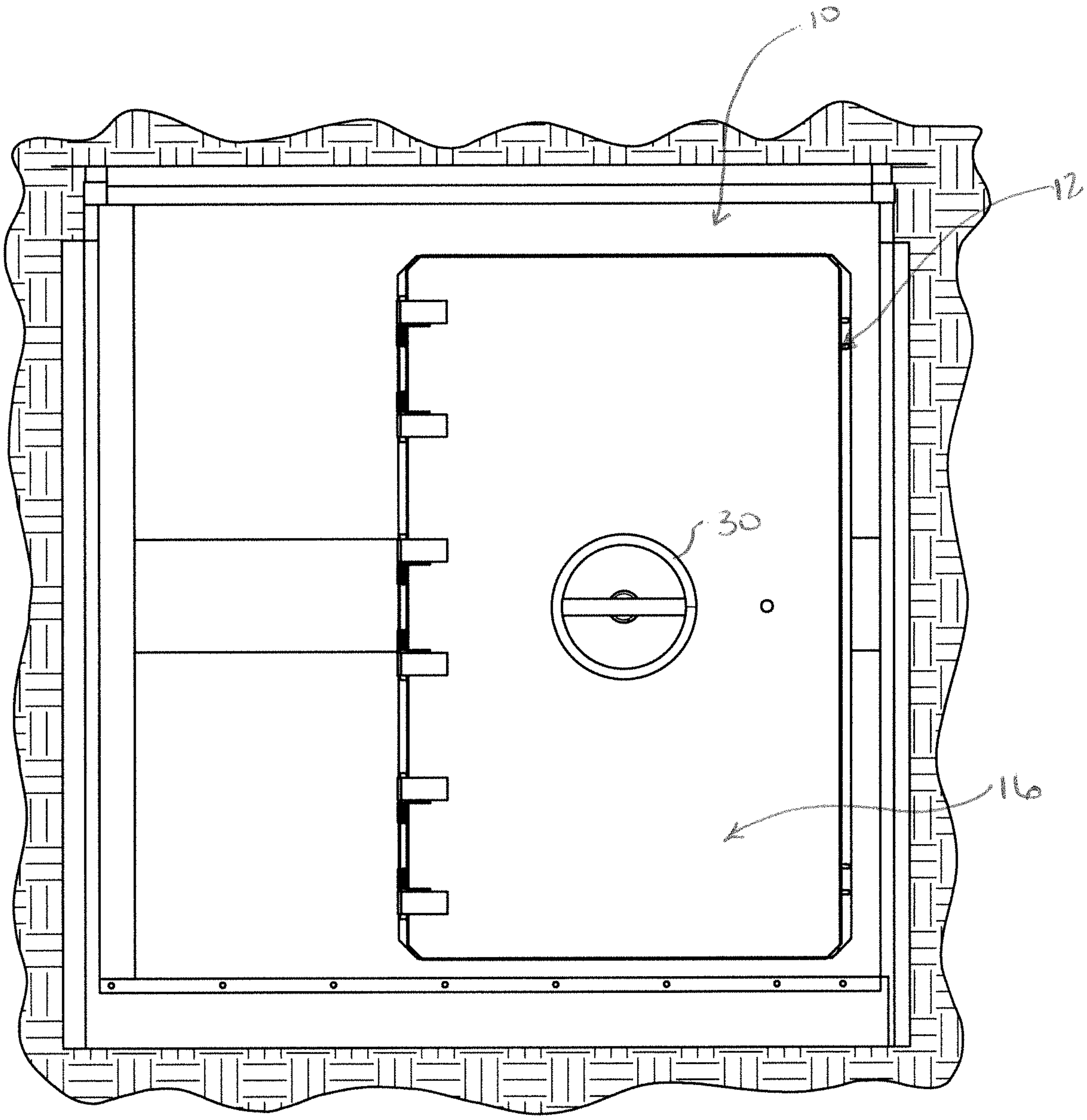
FIG. 14 is a front view of the mine door assembly mounted in a mine.

Referring to FIGS. 1 and 2, one suitable embodiment of a mine door assembly of the present application is indicated generally by 10. The mine door assembly 10 illustrated in FIGS. 1 and 2 is suitable for installation in a mine (FIG. 14), for example, to provide access to a portion of the mine that is blocked off or otherwise restricted from other portions of the mine. In one suitable use, the mine door assembly 10 of the present disclose can be installed as part of a blocking constructed to limit and/or direct air flow in the mine.

Figure 13:
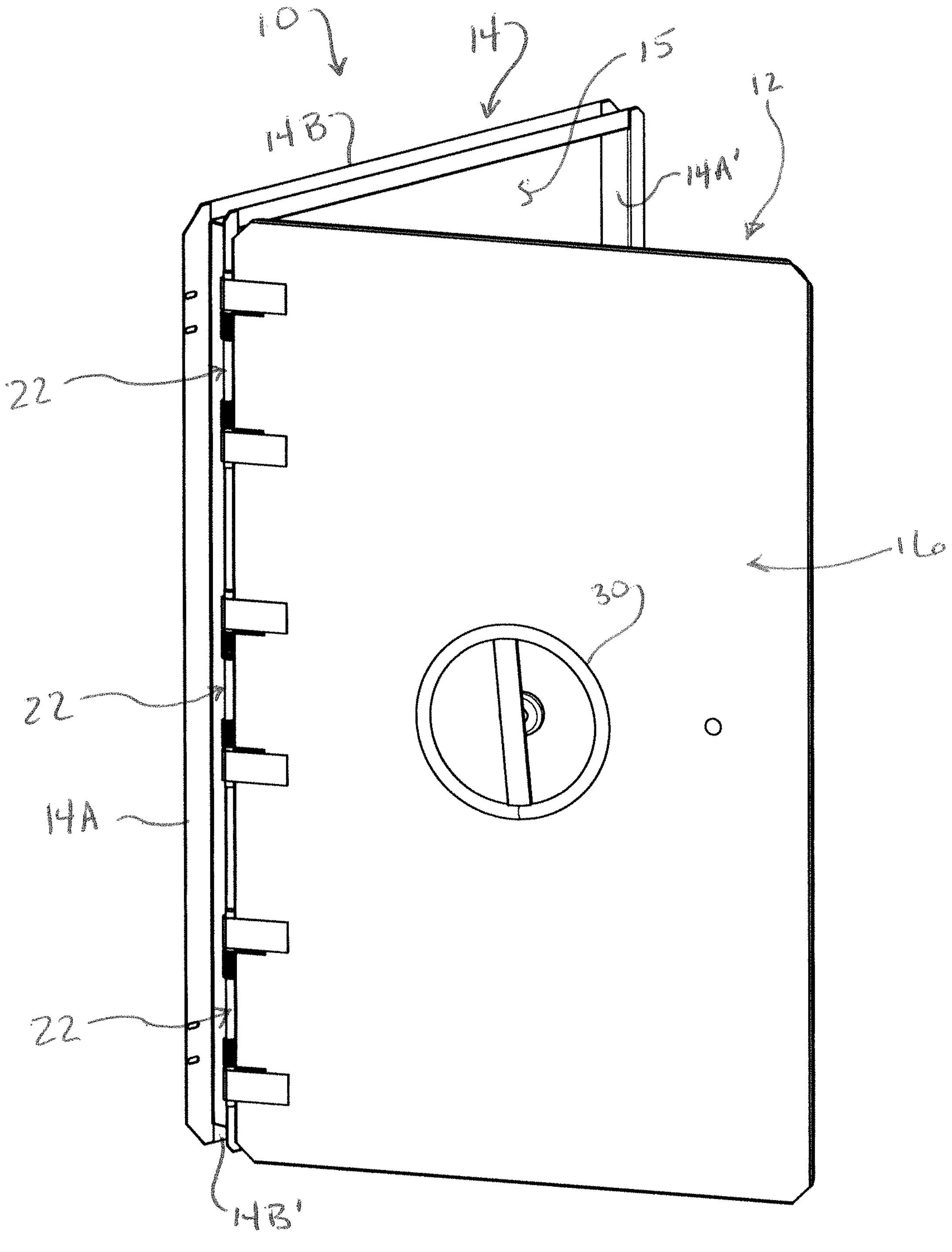
FIG. 13 is a front perspective of the mine door assembly similar to FIG. 1 but illustrating the door moved to the open position.

The door assembly 10 includes, generally, a door 12 and a door frame 14. The door frame 14 comprises left and right frame members 14A, 14A' and upper and lower frame members 14B, 14B' extending between upper and lower ends, respectively, of the left and right frame members. As seen in FIG. 13, the frame 14 defines a door passageway (or opening 15) sized to permit a person (e.g., a mine worker) to pass therethrough. However, the frame 14 and thus the door 12 can have any suitable size and/or shape. In other suitable embodiments, the frame 14 (and associated door 12) is sized larger than illustrated in the accompanying drawings, for example, to allow mining equipment to pass therethrough. In still other suitable embodiments, the frame 14 (and associated door 12) is sized smaller than illustrated in the accompanying drawings, for example, to facilitate regulation of the air flow through the mine.

The illustrated frame members 14A, 14A', 14B, 14B' are C-shaped in cross section to define outer channels for interfacing with stopping panels or other types of stopping construction. Other suitable types of door frames could be used (e.g., including L-shaped or Z-shaped framing members or framing of other types) without departing from some aspects for the present disclosure. In some suitable embodiments, the door frame 14 can be omitted and the door 12 can be mounted directly to other suitable mine structures.

Figure 3:
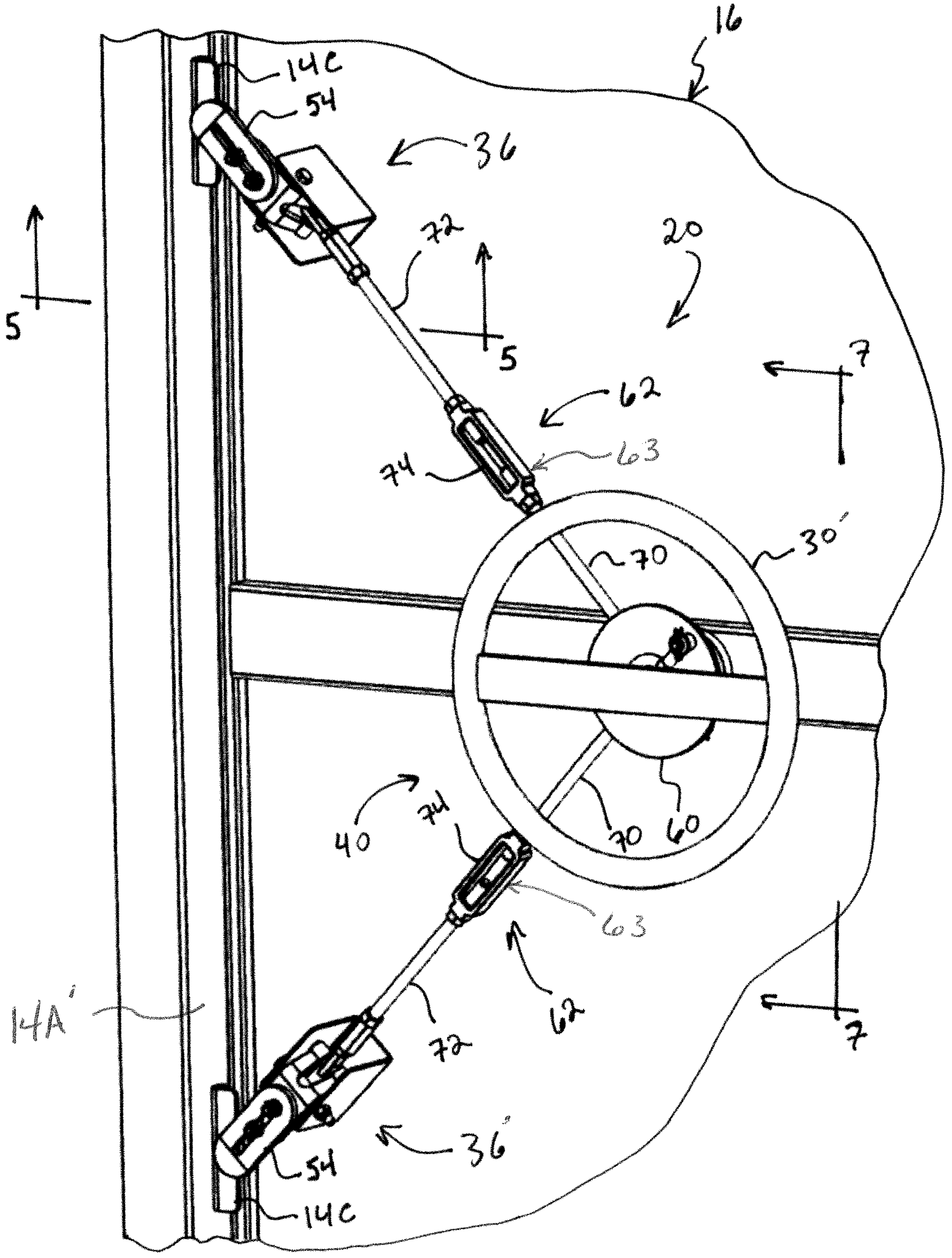
FIG. 3 is an enlarged fragmentary rear perspective of the mine door assembly taken from FIG. 2.

As seen in FIGS. 2 and 3, the door frame 14 includes keepers 14C configured for engagement with the door 12 for retaining the door in a closed configuration, such as shown in FIGS. 1 and 2, as will be described in more detail below. In the illustrated embodiment, the keepers 14C are mounted on the right frame member 14A' but it is understood that the keepers can be mounted on left frame member 14A, upper frame member 14B, and/or lower frame member 14B' without departing from some aspects of this disclosure. The door frame 14 can be constructed of sheet metal or other suitable material.

The door assembly 10 can be used for other purposes without departing from some aspects of the present disclosure. For example, the door assembly 10 could be used for access to a machine and/or for air regulation, not necessarily for personnel to pass through. Moreover, in some instances, the door 12 may be mounted without a dedicated frame 14 but in a way that the door uses other structure (e.g., mine stopping structure) as the door frame for mounting and/or support of the door. That is, in some embodiments, the frame 14 can be omitted.

With reference still to FIGS. 1 and 2, the door 12 includes a door body, indicated at 16, sized and shaped to cover the door opening 15 when the door is closed. The door body 16 includes a rear face 17 (facing out of the page in FIG. 2) configured to face the door opening 15 when the door is closed. The door body 16 includes a front face 19 (facing out of the page in FIG. 1) configured to face away from the door opening 15 when the door is closed. The door body 16 can be constructed of sheet metal or another suitable material. Other configurations can be used without departing from the present disclosure. For example, other door bodies can be used, and the door may not be biased toward closure.

The door 12, as seen in the illustrated embodiment, is mounted on the door frame 14 by spring hinges, indicated at 22, that bias the door toward the closed position. More specifically, the door 12 of the illustrated embodiment is mounted on the left frame member 14A as seen in FIG. 1 such that the door 12 pivots at or adjacent to the left frame member 14A about the hinges 22 as it is moved between the open position and the closed position. The door 12 can be mounted to the frame 14 in any suitable manner that allows the door to be moved between the open and closed positions including hinges without springs or other biasing members. In other embodiments, the door can be mounted on the right frame member 14A', the upper frame member 14B, or the lower frame member 14B'. The door 12 can be mounted on any suitable mine structure in an embodiment wherein the frame 14 is omitted.

Figure 5:
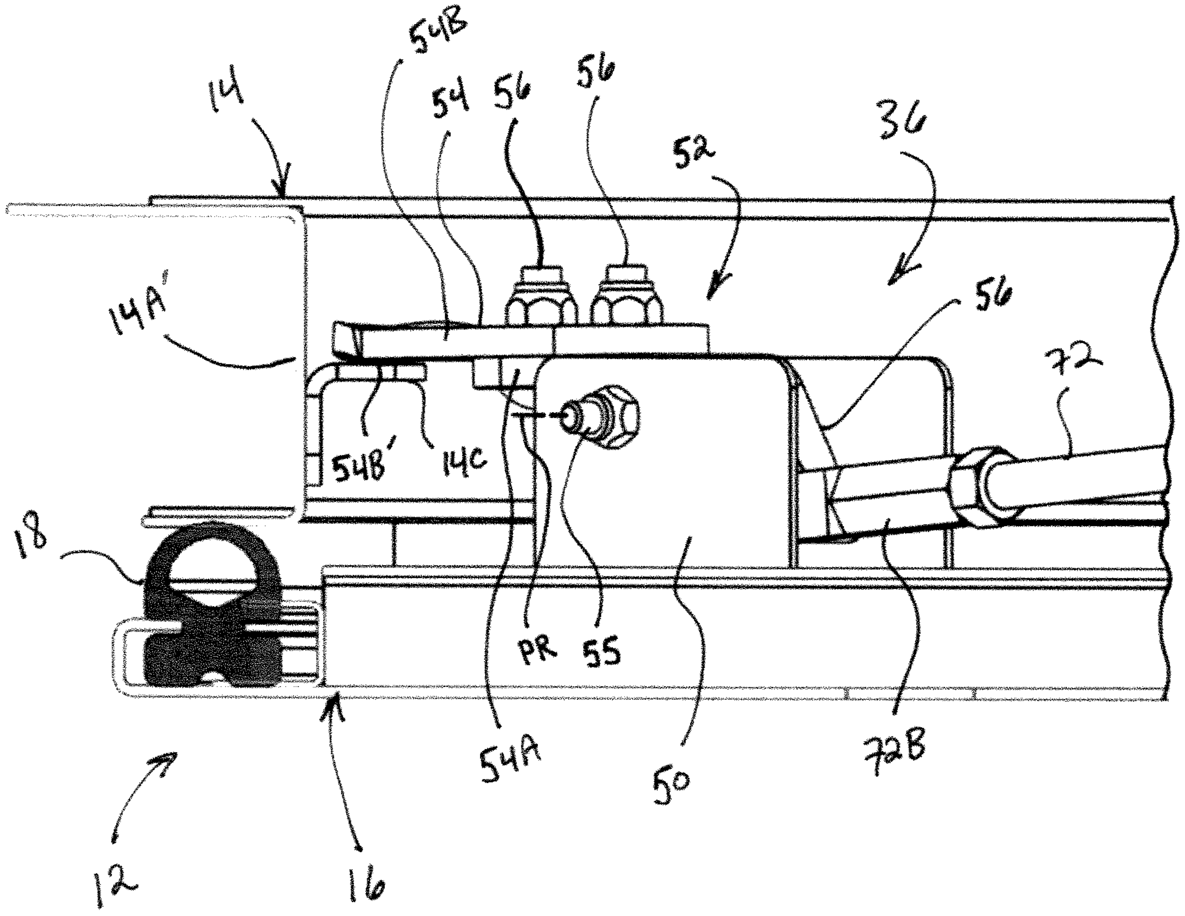
FIG. 5 is a fragmentary section of the mine door assembly taken in a plane including line 5-5 of FIG. 3.
Figure 10:
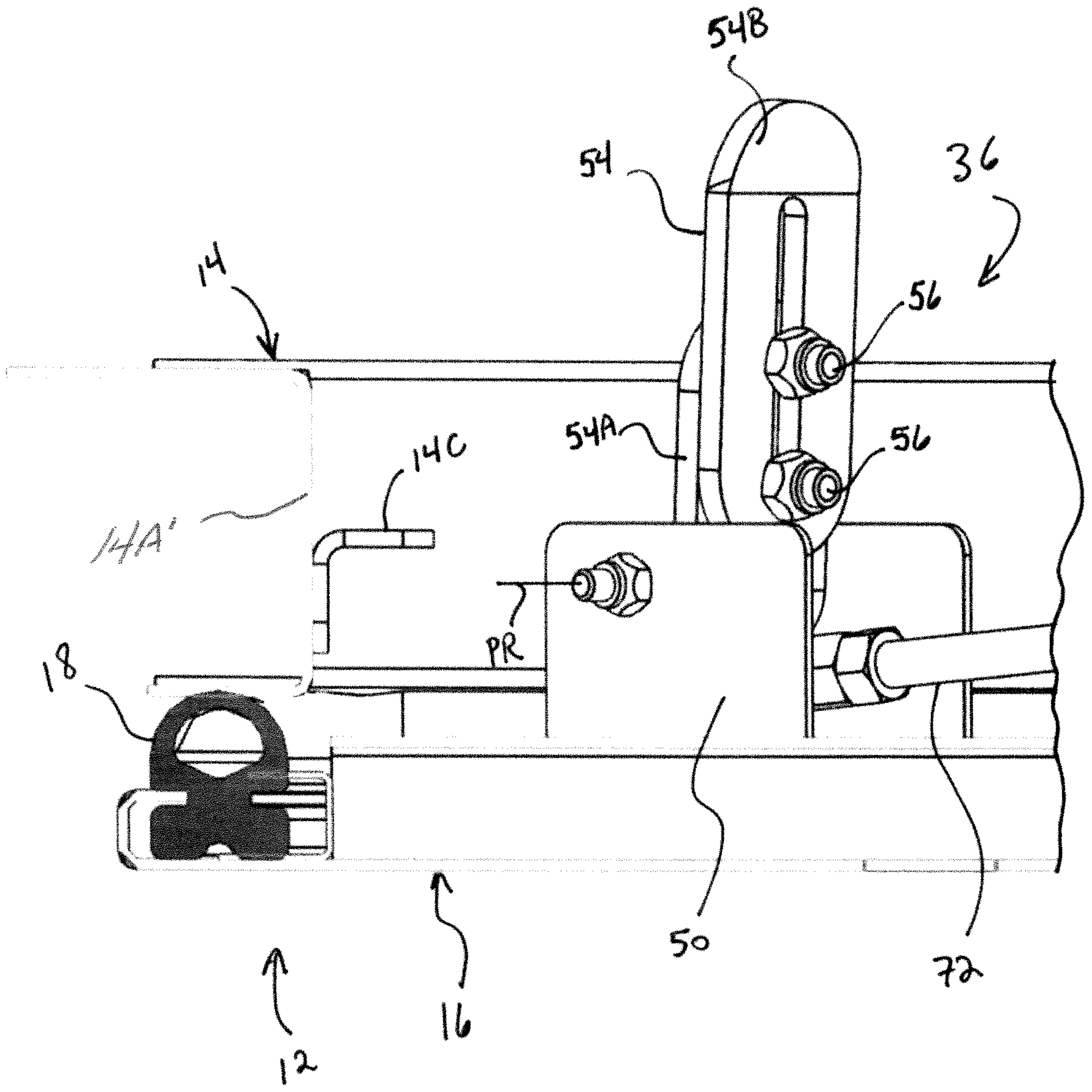
FIG. 10 an enlarged fragmentary section of the mine door assembly taken in a plane including line 10-10 of FIG. 8.
Figure 11:
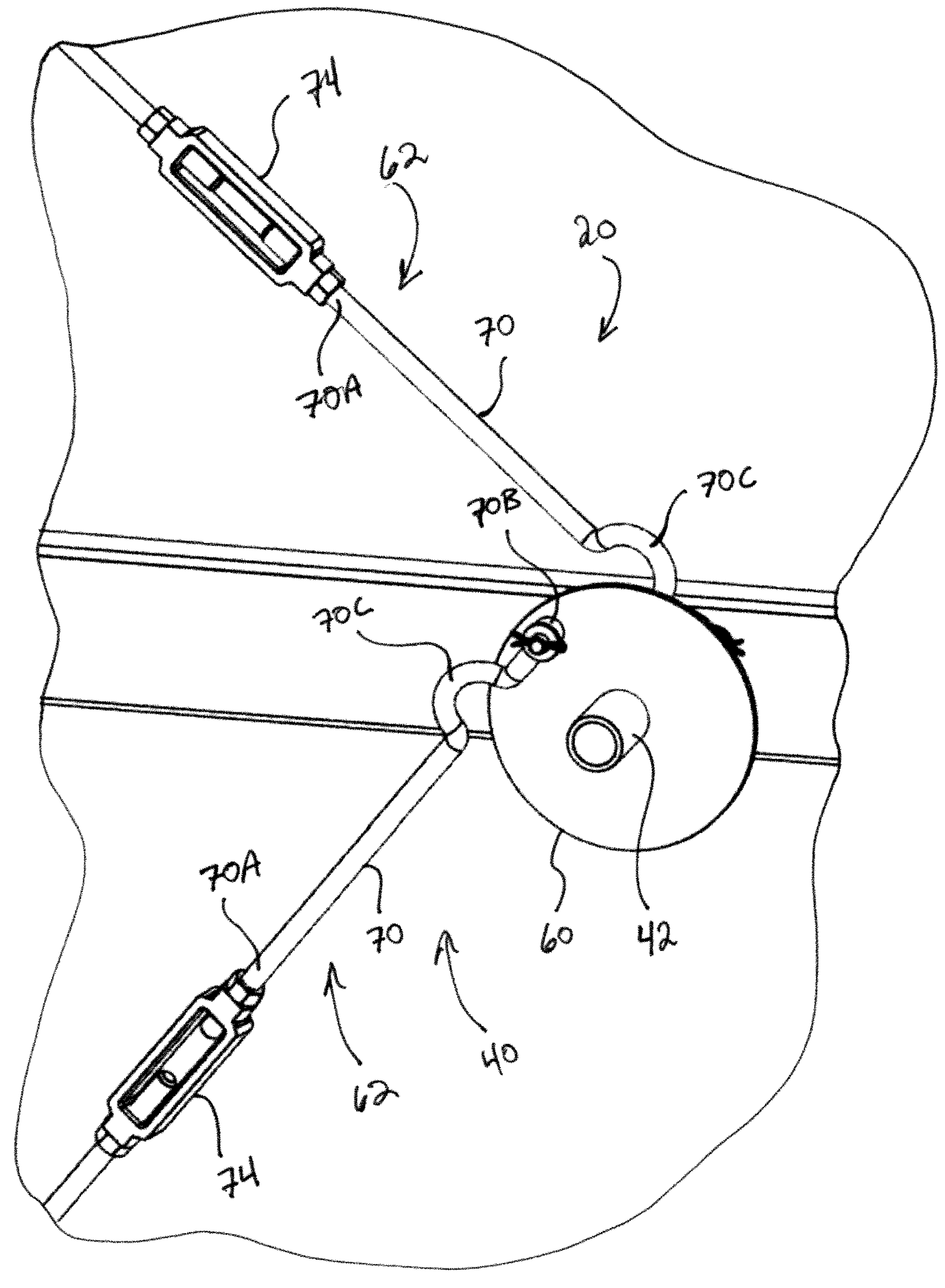
FIG. 11 is an enlarged fragmentary rear perspective of the mine door assembly similar to FIG. 6 but showing the latch assembly in the unlocked configuration.
Figure 12:
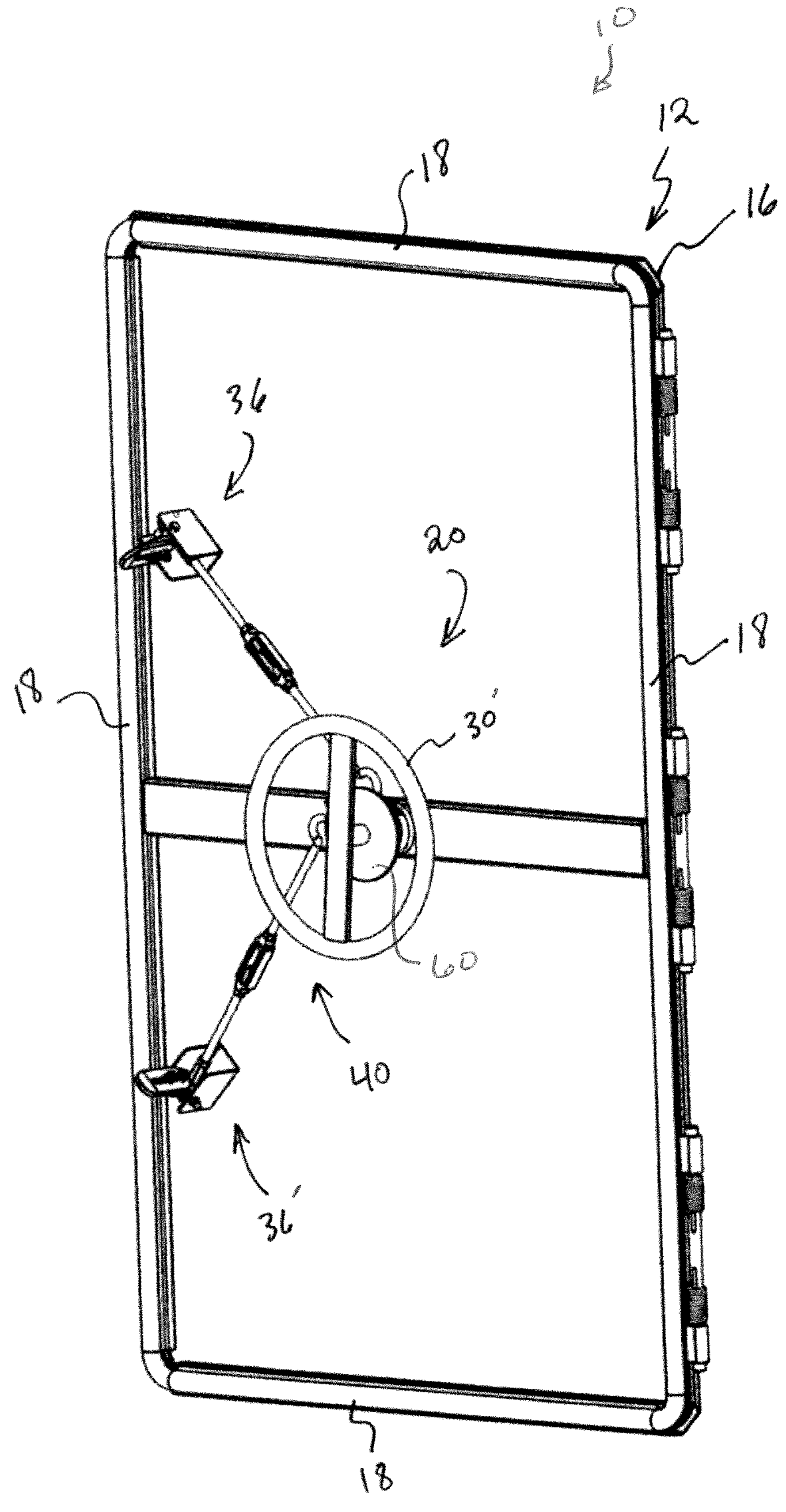
FIG. 12 is a rear perspective of a door of the mine door assembly with the latch assembly shown in the unlocked configuration.

A gasket 18, shown best in FIGS. 5, 10, and 12, is configured to form a seal between the door frame 14 and the door body 16 when the door 12 is in the closed position. The gasket 18 can be made of rubber or other suitable material(s). Suitably, the gasket is resiliently compressible to permit compression of the gasket between the door body 16 and the door frame 14 when the door is in the closed position to facilitate formation of the seal. In one suitable embodiment, the seal is an air-tight seal that inhibits air or other gases within the mine from passing through the door assembly 10. The gasket 18 is in an at-rest state when the door 12 is in the open position and in a compressed state with respect to the at-rest state when the door is in the closed position. Thus, in the closed position of the door 12, the gasket 18 is compressed between the door frame 14 and the door body 16.

The gasket 18 is suitably mounted on or carried by the door body 16 and extends about the entire perimeter of the door body. Other types of door bodies and seals may be used, for example, the gasket 18 can be omitted and/or mounted on the door frame 14 instead of the door body 16. The gasket 18 may also extend about less than the entire perimeter of the door body 16.

A latch assembly indicated generally at 20 is selectively moveable between a latching configuration (e.g., FIGS. 1-7) for retaining the door 12 in the closed position and a non-latching configuration (e.g., FIGS. 8-12) for permitting the door to be moved to the open position. The latch assembly 20, as seen in FIGS. 1-3, includes front and rear wheels 30, 30', upper and lower retainer assemblies 36, 36' (FIG. 2), and a linkage, indicated at 40, operatively connecting the wheels to the retainer assemblies.

Figure 6:
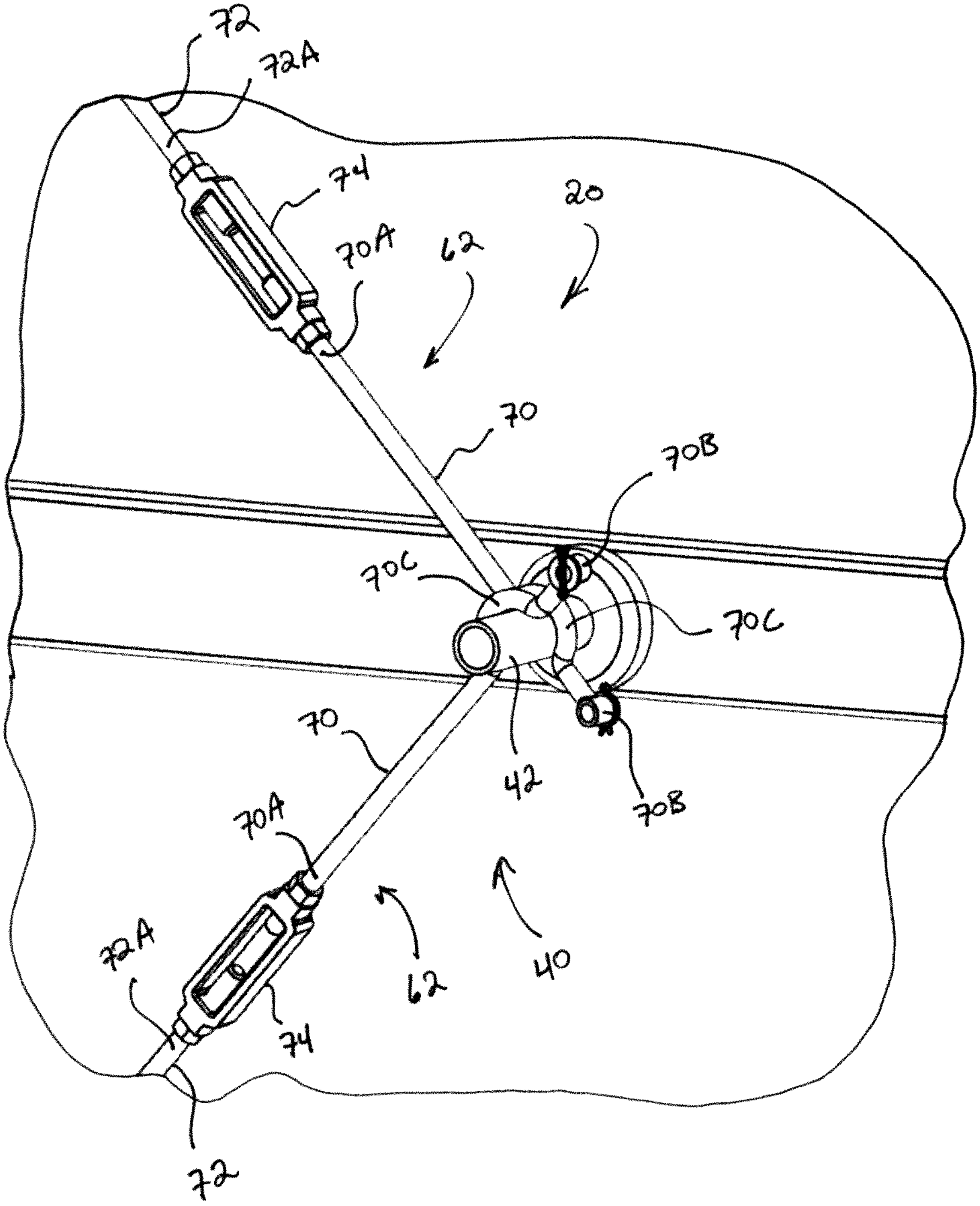
FIG. 6 is an enlarged fragmentary rear perspective of the mine door assembly, a wheel and a crank thereof omitted to show details of a connection linkage.
Figure 7:
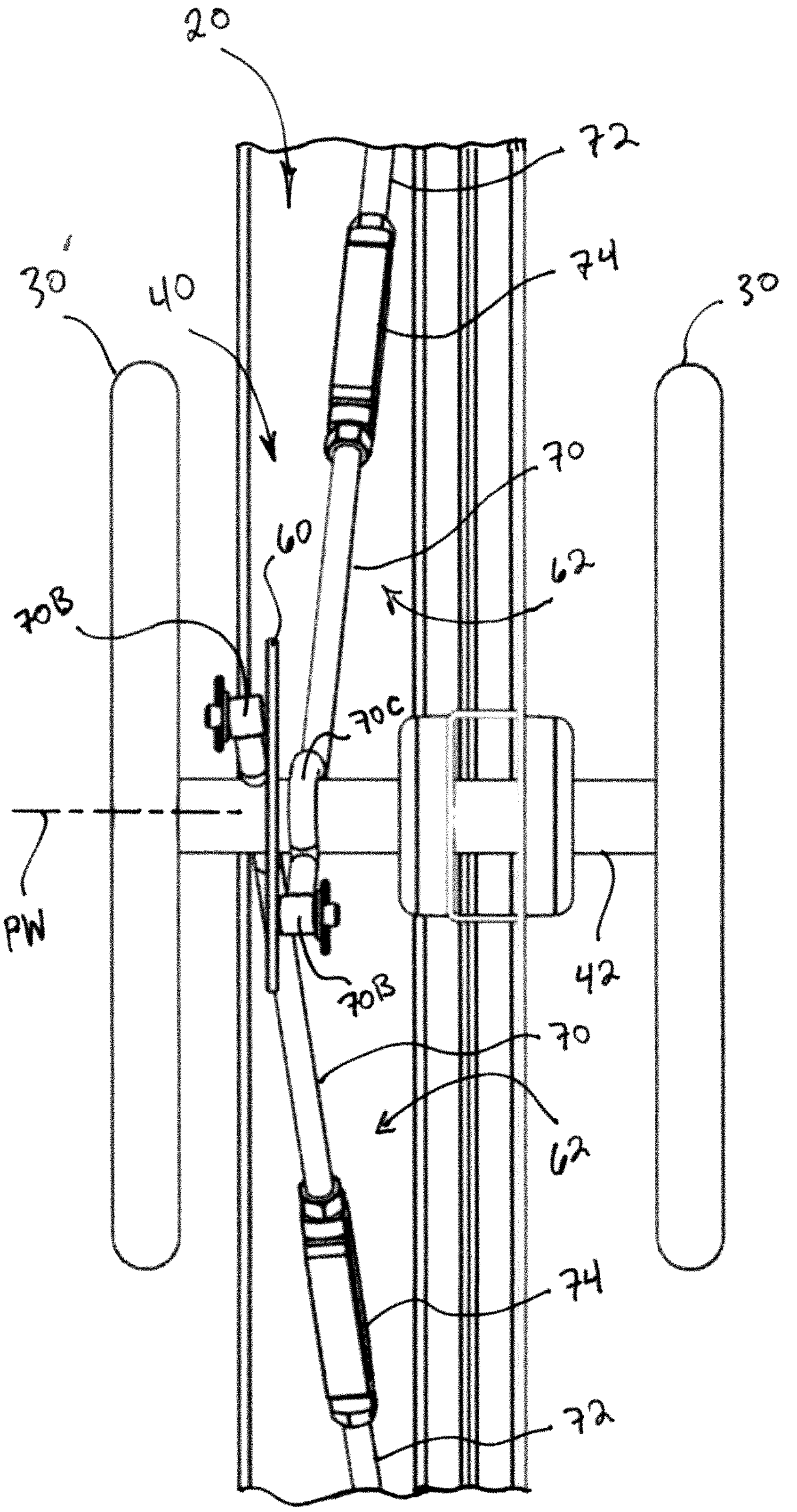
FIG. 7 is a fragmentary section of the mine door assembly taken in a plane including line 7-7 of FIG. 3.

Each wheel 30, 30' may be referred to as an actuator configured to be actuated by hand by a user to change the latch assembly 20 from the latching configuration to the non-latching configuration and vice versa. The wheels 30, 30' are operatively connected to each other by a shaft 42 (FIG. 6) extending through the door body 16. The wheels 30, 30' can be rotated by hand about a pivot axis PW defined by the longitudinal axis of the shaft 42 (FIG. 7). The pivot axis PW is oriented to intersect the rear and front faces 17, 19 of the door body 16, and to intersect the door opening 15 when the door 12 is closed. The wheels 30, 30' are turned (rotated either clockwise or counterclockwise) about the pivot axis PW to move the latch assembly 20 between the latching and non-latching configurations and vice versa. The front wheel 30 permits a person in front of the door to actuate, and the rear wheel 30' permits a person behind the door to actuate. Actuators of other types (e.g., non-wheel actuators, various levers, etc.) may alternatively be used.

Figure 4:
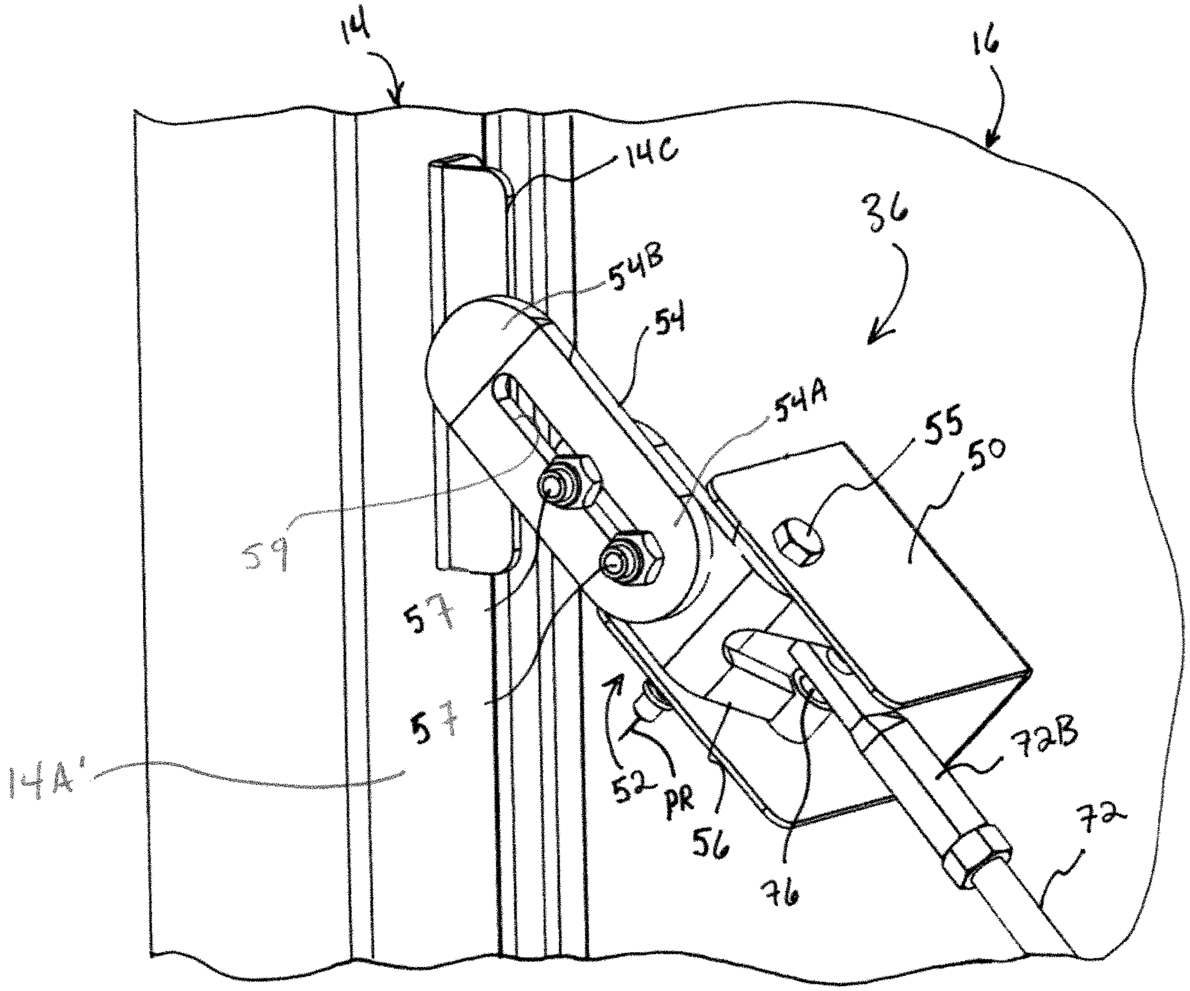
FIG. 4 is an enlarged fragmentary rear perspective of FIG. 3 showing a retainer assembly of the mine door assembly in a retaining configuration.

Referring to FIGS. 3-5, the upper retainer assembly 36 will be described in more detail with the understanding the lower retainer assembly 36' has a similar construction and operation. While the illustrated embodiment has two retainer assemblies 36, 36', any suitable number of retainer assemblies (e.g., one, three, four, etc.) can be used. The upper retainer assembly 36 includes a bracket 50 having a U-shaped cross-section connected (e.g., welded, bolted) to the door body 16 and a retainer, indicated at 52, movable with respect to the bracket between a latching position (FIGS. 3-5) and a non-latching position (FIGS. 8-12). The retainer 52 is configured to engage the door frame 14. More specifically, a keeper 14C mounted to the door frame in the latching position to retain the door body 16 in the closed position (FIGS. 4 and 5), and the retainer is configured to permit the door body to move with respect to the door frame in the non-latching position from the closed position to the open position (FIGS. 9 and 10).

With reference again to FIGS. 4 and 5, the retainer 52 includes a latch 54 and a lever 56. The latch 54 includes a proximal latch portion 54A and a distal latch portion 54B. The lever 56 and thus the latch 54, which is attached to the lever, is pivotably connected to the bracket 50 by a bolt 55 defining a pivot axis PR of the retainer 52. Other types of connections (e.g., other types of pivot connections, such as a pin or rivet connection) can be used without departing from the scope of the present disclosure. The retainer 52 is moveable in a direction toward the latching position into engagement with the door frame 14 and the retainer is configured to press against the door frame and specifically the keeper 14C in that direction when the retainer is in the latching position to retain the door body 16 in the closed position.

The latch 54 is connected to the lever 56 by two fasteners 57 (e.g., bolts). The fasteners 57 are received in a longitudinal slot 59 of the latch 54. The position of the latch 54 with respect to the lever 56 can be changed by loosening the fasteners 57, sliding the latch portion (permitted by reception of the fasteners in the slot), and tightening the fasteners when the latch portion is in a desired position relative to the lever. As illustrated in FIG. 5, the distal latch portion 54B has an engagement surface 54B' arranged to engage the keeper 14C of the frame 14 when the retainer 52 is in the latching position and the door is closed. The length adjustment feature of the latch 54 permits the latch to be adjusted if needed to properly engage the keeper 14C, such as when the door frame 14 has deformed due to mine convergence. Latch 54 may be configured to engage a framing member of the door frame (or some other structure, such as a portion of the mine blocking) rather than a dedicated keeper. Moreover, other length adjustment features (e.g., including Belleville washers in combination with a bolt or calibrated tension rivet, etc.) could be used to permit adjustment of the distal latch portion with respect to the proximal latch portion, without departing from the scope of the present disclosure. In some cases, loosening and subsequent tightening of a connection may not be needed to permit adjustment of the latch.

The pivot axes PR of the retainers 52 are nonparallel with respect to the pivot axis PW of the wheels 30, 30'. More specifically, the retainer pivot axes PR are oriented generally perpendicular with respect to the pivot axis PW of the wheels. Other configurations may be used.

Figure 8:
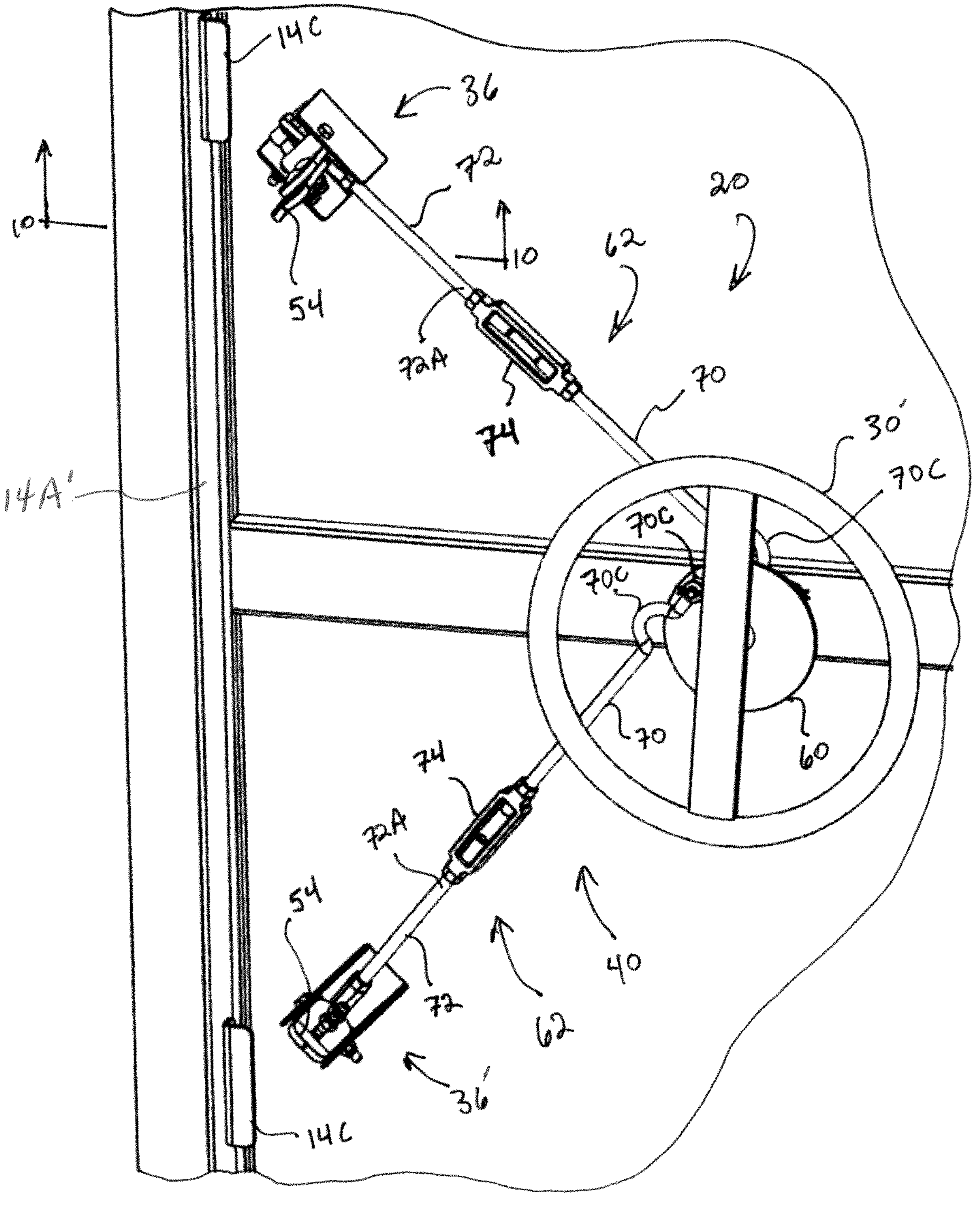
FIG. 8 is an enlarged fragmentary rear perspective of the mine door assembly similar to FIG. 3 but showing a latch assembly thereof in an unlocked configuration.
Figure 9:
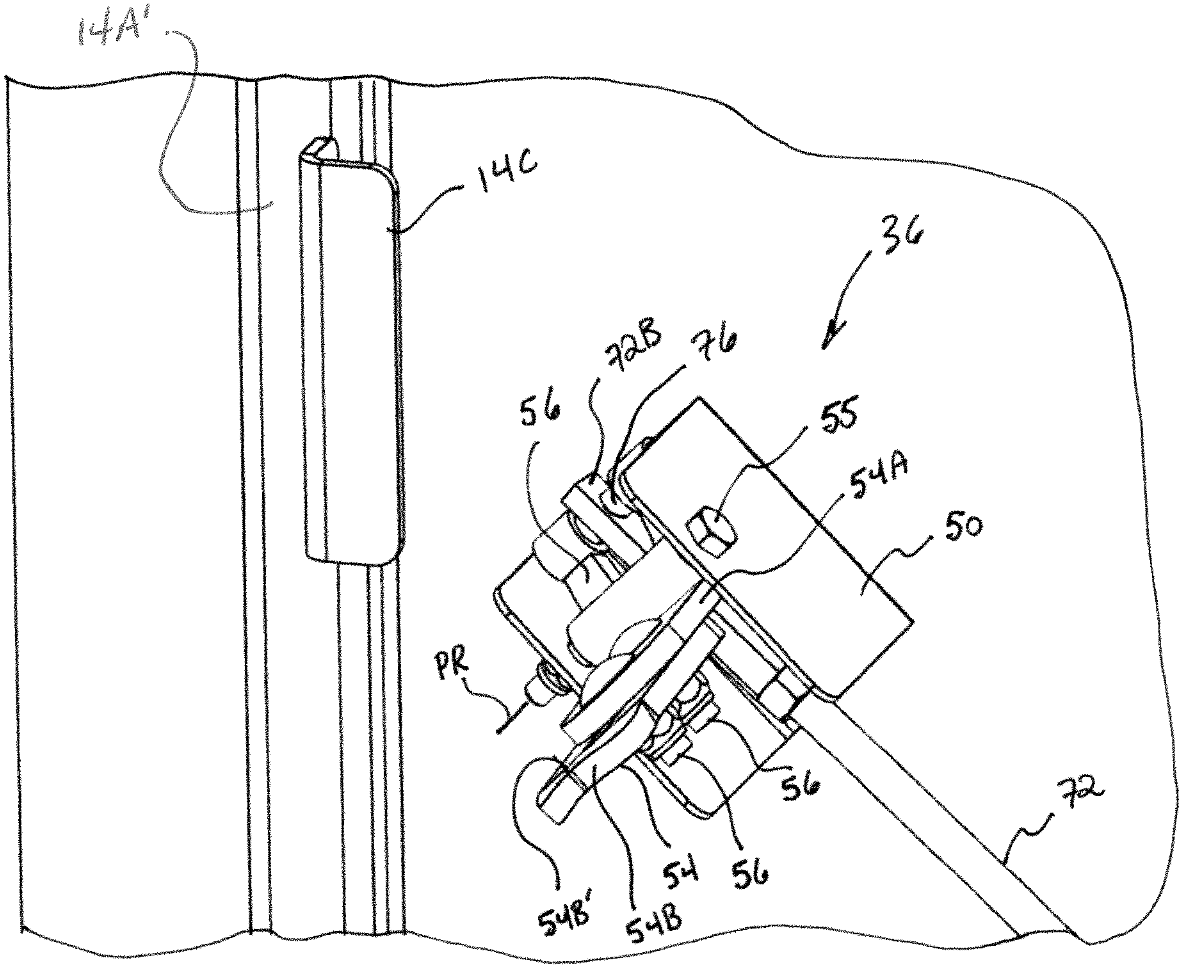
FIG. 9 is an enlarged fragmentary rear perspective of the retainer assembly similar to FIG. 4 but showing the retainer assembly in a non-latched configuration.

With reference now to FIGS. 3 and 8, the linkage 40 operatively links the wheels 30, 30' to the retainers 52 to drive movement of the retainers responsive to movement of the wheels. The linkage 40 is configured to move the retainers 52 in a latching direction toward the latching position and in an unlatching direction toward the non-latching position responsive to rotation of the wheels 30, 30'. More specifically, the linkage 40 includes an upper link 62 that operatively connects the wheels 30, 30' to the upper retainer assembly 36, and a lower link 62' that operatively connects the wheels 30, 30' to the lower retainer assembly 36'.

As illustrated in FIGS. 3, 7 and 8, a crank 60 is mounted on the wheel shaft 42 and is rotatable conjointly with the wheel shaft such that turning of the wheels 30, 30' results in rotation of the crank 60. The upper link 62 connects the crank 60 to the upper retainer assembly 36, and the lower link 62' connects the crank to the lower retainer assembly 36' independent of the upper link.

The upper and lower links 62, 62' comprise turn buckles 63 that permit adjustment of the lengths of the upper and lower links. The turn buckles 63 can be generally referred to as length adjusters. The turn buckles 63 can be adjusted independently with respect to each other to change the length of one of the links 62, 62' or to change the lengths of the links different amounts. Adjustment of the length of the links 62, 62' can be performed to change the latching positions of the retainer assemblies 36, 36'. Such adjustment can be useful in adjusting the door assembly 10 to operate properly after deformation of the door 12 and/or frame 14 from mine convergence. Other types of length adjusters (e.g., coupling nut or other structure) may be used.

The turn buckles 63 each include a proximal connector 70, a distal connector 72, and a rotatable body 74 having threaded connections with the proximal and distal connectors. The proximal connector 70 includes a threaded shaft 70A and a fitting 70B pivotably connected to the crank 60 (FIG. 7). As illustrated in FIG. 6, between the threaded shafts 70A and the fittings 70B, intermediate segments 70C of the proximal connectors 70 are curved to define recesses in the connectors sized and shaped to receive the wheel shaft 42 when the latch assembly 20 is in the latched configuration. The curved intermediate segments 70C permit the links to move "over center" with respect to the pivot axis PW of the wheel shaft as explained in more detail below.

The distal connector 72 includes a threaded shaft 72A and a fitting 72B pivotably connected to the lever 56 of the retainer assembly 36, 36'. The lever 56 includes a yoke that holds a pivot pin 76 to which the fitting 72B of the distal connector is pivotably connected. In operation, the link 62 pulls the lever 56 to move the retainer 52 toward the latching position, or pushes the lever to move the retainer toward the unlatching position depending on which way the wheels 30, 30' are turned.

Rotation of the wheels 30, 30' causes conjoint rotation of the crank 60 via the wheel shaft 42, which drives movement of the links 62 to pivot the retainer assemblies 36, 36'. When the wheels 30, 30' are rotated in a locking direction about the pivot axis PW of the wheel shaft, the crank 60 pulls the links 62 and thus the levers 56 of the retainer assemblies to pivot the retainers in the latching directions (see, e.g., FIG. 15). The crank 60 is configured to increase mechanical advantage to move the retainers 52 toward the respective latching positions as the retainers approach the latching positions. After the retainers 52 engage the keepers 14C, further rotation of the wheel 30 causes tension in the links 62 and causes the retainers 52 to press against the keepers to draw the door body 16 toward the frame 14 to compress the gasket 18. The compression of the gasket 18 is increased by the mechanical advantage of the crank 60 increasing as the links 62 move toward the over center position. After the links 62 pass over center, the gasket 18 partially expands toward its at-rest state, until the curved intermediate segments 70C of the links engage the wheel shaft 42.

The over-center configuration of the linkage 40 when the retainers 52 are in their latching positions provides several benefits. The biasing or expanding force of the gasket 18 attempting to expand to its at-rest state causes the retainers 52 to be biased against the keepers 14C. The gasket 18 acts through the door body 16 and the bracket 50 to bias the retainer 52 toward the keeper 14C. Pivoting of the retainers 52 in the unlatching direction is resisted by the curved intermediate segments 70C of the proximal connectors 70 resting against the wheel shaft 42. The expanding force of the gasket 18 tending to expand acts through the retainers 52 to tension the links 62 to bias the links to tend to move farther over center.

Typically, the door would be installed such that higher air pressure in the mine tends to press the door body against the door frame to maintain the door closed. However, air pressure conditions in the mine can change. For example, the air pressure conditions may change unintentionally, such as from a blast in the mine. Alternatively, the designed air pressure conditions may be changed intentionally (e.g., to facilitate a different flow of air in the mine), but without first changing the mounting orientation of the door. In such situations, where increased air pressure is applied against the back face of the door body 16 tending to open the door body, such opposite force, like the expansion force of the gasket 18, is opposed by the curved intermediate segments 70C resting against the wheel shaft 42 to maintain the retainers 52 in the latching positions.

The over center configuration and expansion force of the gasket 18 act to lock the retainer assemblies 36, 36' in the latching positions unless a user applies sufficient unlocking rotational force to one of the wheels 30, 30' to sufficiently compress the gasket 18 to permit the proximal connectors 70 to be moved back over center. The crank 60 increases mechanical advantage to compress the gasket 18 and permits a user to smoothly unlock the door by moving the linkage 40 out of its over center configuration.

Although the gasket 18 is designed to provide a biasing force that acts through the over-center arrangement, other forces can also facilitate such operation. For example, the curved intermediate segments 70C of the proximal connectors 70 are configured to be somewhat resiliently extendable (e.g., by temporary straightening/elongation of the curved portion). Moreover, the door body itself is to an extent resiliently deformable, such as by deflection of a central portion of the door body relative to a periphery of the door body. Rotation of the wheels 30 toward the over-center-configuration causes tension in the links 62 (and thus the curved intermediate segments 70C) and causes the central portion of the door body to deflect relative to the periphery of the door body. The force of the curved intermediate segments 70C and of the door body attempting to resiliently regain their at-rest configurations provides a biasing force that acts in a similar manner as explained above with respect to the gasket 18. In some embodiments, the gasket 18 can be omitted and biasing force can be provided via resilient deformation of a different component of the door system (such as a component of the linkage or the door body).

Figure 15:
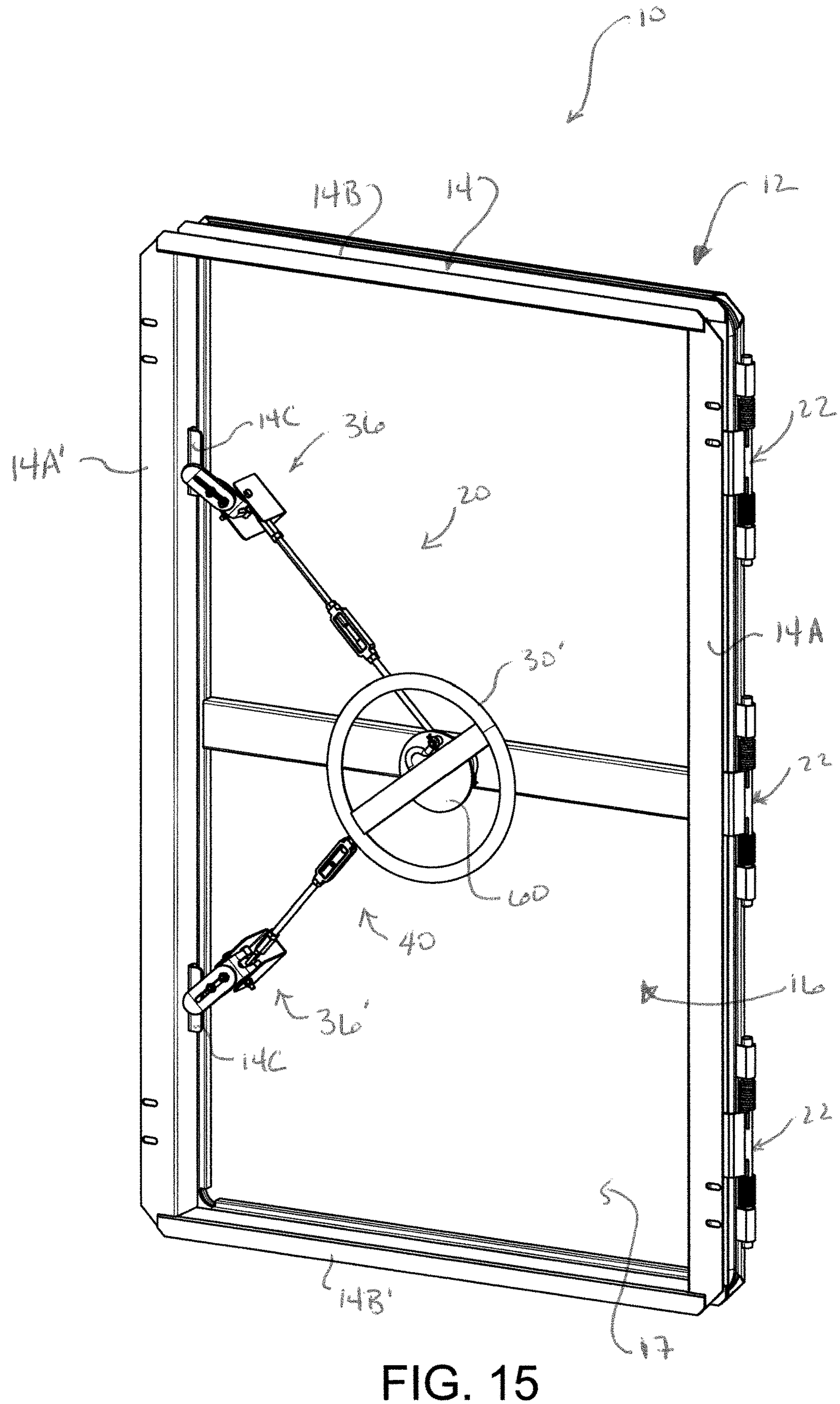
FIG. 15 a rear perspective of the mine door assembly showing the latch assembly being moved from the locked configuration to the unlocked configuration.

The wheels 30, 30' are rotatable in a first direction about the axis of rotation AW to drive movement of the linkage 40 to move the retainer assemblies 36, 36' in the latching direction, and the wheels are rotatable in a second opposite direction about the axis of rotation to drive movement of the linkage to move the retainer assemblies in the unlatching direction. FIG. 15, for example, illustrates the latch assembly 20 being moved from the locked configuration to the unlocked configuration by rotation of the wheel 30'.

The crankshaft mechanism causes the latches to open quickly and fully (e.g., about 90 degrees or more from the latching position) with relatively minimal rotation of the wheel. This can be beneficial not only for easy opening of the door but also for permitting substantial movement of the latches to enable operability in extreme situations, such as where mine convergence has deformed the frame, where ample latch travel is needed to engage the keeper for closing the door and/or to clear the latch for opening the door.

In the illustrated embodiment, the pivot axis PW of the wheel shaft 42 is oriented to intersect the door opening 15 when the door 12 is in the closed position, and the pivot axes PR of the retainers are oriented generally perpendicular with respect to the pivot axis PW of the wheel shaft. Other configurations can be used without departing from the scope of the present disclosure.

The mine door assembly 10 is configured to be functional no matter which end of the door is positioned to be the upper end of the door. The wheels 30, 30' and linkage 40 function properly in an inverted orientation, and gravity does not cause the retainer assemblies 36, 36' to move out of the latching or non-latching positions no matter which end of the door is oriented upward.

It will be apparent that modifications and variations are possible without departing from the scope of the invention defined in the appended claims.

In one example, the door latching mechanism can be mounted on the door frame rather than on the door. For example, the wheels 30, 30', linkage 40, and retainer assemblies 36, 36', can be mounted on a door frame rather than on the door body. The latching mechanism may also work in a similar fashion but be supported by the frame (or other structure, such as a mine stopping, or machine enclosure) rather than the door body. When the door is latched, the door would be retained in a closed position between a keeper (or other portion of the door frame) and one or more latches. When the latches are opened (e.g., by rotation of a wheel or other actuator), the latches are clear of the door to permit the door to be swung open.

The actuator is shown as including manually turnable wheels 30, 30', other types of actuators can be used. Moreover, the door latching mechanism can be motorized, in which case the actuator can be a button, switch, or other suitable actuator for powering the door linkage mechanism to open or to close.

The linkage may include one or more links configured to be in compression (rather than tension) to facilitate latching of the door and/or maintaining the door closed. In one example, the retainers can be "flipped over" to provide compression in links rather than compression.

When introducing elements of the present invention or embodiments thereof, the articles "a", "an", "the" and "said" are intended to mean that there are one or more of the elements. The terms "comprising", "including" and "having" are intended to be inclusive and mean that there may be additional elements other than the listed elements.

As various changes could be made without departing from the scope of the invention, it is intended that all matter contained in the above description and shown in the accompanying drawings shall be interpreted as illustrative and not in a limiting sense.

What is claimed is:

1. A latch assembly for a door having a door body mounted on a door frame, the door body being moveable relative to the door frame between an open position of the door and a closed position of the door, the latch assembly comprising:

a retainer movable between a latching position and a non-latching position, the retainer configured in the latching position to retain the door body in the closed position of the door, and the retainer configured to permit the door body to move with respect to the door frame in the non-latching position to permit the door body to move to the open position of the door;

an actuator selectively moveable by a user to change the retainer from the latching position to the non-latching position;

a shaft to which the actuator is mounted;

a linkage operatively linking the actuator to the retainer, the linkage being configured to move the retainer in a latching direction toward the latching position and in an unlatching direction toward the non-latching position responsive to actuation of the actuator, the linkage including a curved segment defining a recess sized and shaped for capturing the shaft when the linkage is in an over-center configuration and the retainer is in the latching position; and a crank operatively connected to the actuator and linkage and configured to move the retainer toward the latching position as the retainer approaches the latching position.

2. The latch assembly as set forth in claim 1, wherein the linkage opposes pivoting of the retainer in the unlatching direction when the linkage is in the over-center configuration.

3. The latch assembly as set forth in claim 1, wherein the linkage includes an upper linkage and a lower linkage, the upper linkage being operatively connected to the crank independently of the lower linkage.

4. The latch assembly as set forth in claim 1, wherein the crank is mounted to the shaft for movement with the actuator.

5. The latch assembly as set forth in claim 1, wherein the actuator comprises a wheel rotatable about an axis of rotation, the wheel being rotatable in a first direction about the axis of rotation to drive movement of the linkage to move the retainer in the latching direction, and the wheel being rotatable in a second direction about the axis of rotation to drive movement of the linkage to move the retainer in the unlatching direction.

6. The latch assembly as set forth in claim 1, wherein the actuator is pivotable about a first pivot axis in a first direction to drive movement of the linkage to move the retainer in the latching direction, and the actuator is pivotable about the first pivot axis in a second direction to drive movement of the linkage to move the retainer in the unlatching direction, and the retainer is pivotable about a second pivot axis between the latching and non-latching positions.

7. The latch assembly as set forth in claim 6, wherein the second pivot axis is nonparallel with respect to the first pivot axis.

8. A latch assembly for a door having a door body mounted on a door frame, the door body being moveable relative to the door frame between an open position of the door and a closed position of the door, the latch assembly comprising:

a retainer movable between a latching position and a non-latching position, the retainer configured in the latching position to retain the door body in the closed position of the door, and the retainer configured to permit the door body to move with respect to the door frame in the non-latching position to permit the door body to move to the open position of the door;

an actuator selectively moveable by a user to change the retainer from the latching position to the non-latching position;

a shaft to which the actuator is mounted; and a linkage operatively linking the actuator to the retainer, the linkage being configured to move the retainer in a latching direction toward the latching position and in an unlatching direction toward the non-latching position responsive to actuation of the actuator, wherein the linkage is configured to be in an over-center configuration when the retainer is in the latching position, the linkage including a curved segment defining a recess sized and shaped for capturing the shaft when the linkage is in the over-center configuration and the retainer is in the latching position.

9. The latch assembly as set forth in claim 8, further comprising a crank operatively connecting the actuator to the linkage.

10. The latch assembly as set forth in claim 8, wherein the linkage comprises a length adjuster configured to change a length of the linkage.

11. The latch assembly as set forth in claim 8, wherein the retainer includes a latch and a lever, the linkage being connected to the lever and configured to pull the lever to move the retainer in the latching direction.

12. The latch assembly as set forth in claim 11, wherein the linkage is configured to push the lever to move the retainer in the unlatching direction.

13. A mine door installed in a mine for selectively opening and closing a door passageway of a door frame, the mine door comprising:

a door body moveable between a closed position of the door and an open position of the door to selectively close and open the door passageway, the door body including a first face configured to face the door passageway when in the closed position, and a second face configured to face away from the door passageway when in the closed position;

a latch assembly supported by the door body, the latch assembly moveable between a latching configuration for retaining the door body in the closed position and in a non-latching configuration for permitting the door body to be moved to the open position, the latch assembly comprising:

a first retainer and a second retainer, each of the first retainer and the second retainer being movable between a latching position and a non-latching position, the first and second retainers in the latching position retaining the door body in the closed position, and permitting the door body to move with respect to the door frame in the non-latching position to move to the door body to the open position, the first retainer including a first latch and a first lever, and the second retainer including a second latch and a second lever;

an actuator actuable to change the latch assembly from the non-latching configuration to the latching configuration; and a linkage including a first linkage and a second linkage, the first linkage operatively connecting the first retainer to the actuator independent of the second linkage, and the second linkage operatively connecting the second retainer to the actuator independent of the first linkage, the first linkage being connected to the first lever and configured to pull the first lever to move the first retainer toward the latching position, and the second linkage being connected to the second lever and configured to pull the second lever to move the second retainer toward the latching position, the first linkage and the second linkage being configured to be in an over-center configuration when the first and second retainers are in the respective latching positions; and a resiliently compressible seal having an at-rest state and being configured to be resiliently deformed from the at-rest state by compression between the door body and the door frame when the door body is moved to the closed position, and wherein the first linkage and the second linkage are configured to be biased by the resiliently deformed seal toward the over-center configuration.

14. The mine door as set forth in claim 13, further comprising a first keeper and a second keeper, wherein each of the first retainer and the second retainer is pivotable about a pivot axis between the latching and non-latching positions, the first retainer including an engagement surface configured to engage the first keeper in the latching position to retain the door body in the closed position and the second retainer including an engagement surface configured to engage the second keeper in the latching position to retain the door body in the closed position, each of the first retainer and the second retainer being pivotable in a first direction toward the latching position into engagement with the door frame, each of the first retainer and the second retainer being configured to press against the door frame in the first direction when the first retainer and the second retainer is in the latching position to retain the door body in the closed position.

* * * * *